United States Patent Office 3,671,317
Patented June 20, 1972

3,671,317
METHOD OF MAKING FUEL CELL ELECTRODES
Ernest Rifkin, De Witt, N.Y., assignor to United Aircraft Corporation, East Hartford, Conn.
No Drawing. Filed Feb. 10, 1970, Ser. No. 10,165
Int. Cl. H01m 27/00; B01k 3/04
U.S. Cl. 117—216
3 Claims

ABSTRACT OF THE DISCLOSURE

In expensive screen substrates for fuel cell electrodes are provided with a nonporous vinylidene fluoride corrosion resistant coating. Thereafter, a second, metal particle and porous polymer, coating is provided. Cure of the second coating must be compatible with the first coating and monitored to prevent the flow of the polymer in the second coating so that a porous structure with the desired hydrophilic properties and conductive properties preferred in electrode structure can be obtained.

BACKGROUND OF THE INVENTION

This invention concerns fuel cell electrodes and more specifically relates to the use of inexpensive electrode substrate structures.

Electrode substrates are currently made of high cost materials due to the corrosive fuel cell environment. Cost is the most serious stumbling block to the development of a commercially attractive fuel cell. In the case of acid electrolyte cells, electrodes are often fabricated from tantalum screen substrates. While a tantalum substrate is fairly acceptable as a cathode, the tantalum substrate does not provide an extended life at the anode due to a hydrogen embrittlement problem. Nickel and other materials used in base cell electrodes exhibit corrosion problems. Most of the substrates are fabricated from 50 to 100 mesh screen with 2 to 4 mil wire.

The art teaches such electrode characteristics as the hydrophilic micropore and hydrophobic macropore section. Typically, electrodes are designed to retain electrolyte within its surfaces to maintain a three-phase interface within the electrode. For electrodes to function properly, the electrode substrate must provide a structure of sufficient pore size and porosity to allow the reactant gas to occupy a portion of the volume and also to allow certain areas to be flooded with the ion conducting liquid electrolyte. Electrodes constructed by sintering a deposited polymer and catalyst within the pores of a porous metal or metallic screen exhibit corrosion problems since the sintered polymers are of necessity porous. Teflon due to its hydrophobic character and impervious nature is the preferred polymer binder. The wet-proofing materials, binders, and the processes for fabricating electrodes are well known. As stated, the processes and materials used in the art result in non-protective porous coatings.

SUMMARY OF THE INVENTION

It is an object of this invention to provide an improved process for fabricating a fuel gas diffusion electrode from low cost structures.

Another object of this invention is the provision of an electrode substrate having a dual coating layer applied thereto. A feature of the invention lies in providing a corrosion resistant protective coating for porous electrode substrate compatible with a superimposed conductive catalyst-binder composition.

A further object of this invention concerns the process for providing a dual coating whereby the dual coatings are provided by applying a thermoplastic to an inexpensive porous substrate followed by the application of a fluorocarbon polymer coating containing conductive particles preferably with catalyst. Curing must be compatible with the application of the first protective coating. One aspect of this process concerns its applicability to screen substrates.

In accordance with this invention, a porous metal substrate (screen preferably) is first cleaned and coated with a dissolved fluorinated hydrocarbon. This coating is cured to provide a nonporous coating. A second coating consisting of a fluorinated hydrocarbon and a conductive metal particles is superimposed and thereafter cured. It has been discovered that vinylidene fluoride in a methyl isobutylketone solution provides a continuous pore free coating on the substrate. Vinylidene fluoride is plastic and retains its pore free characteristics even after a second coating of preferably polytetrafluoroethylene and carbon particles is applied. An appropriate catalytic material can be added with the carbon particles.

DESCRIPTION OF THE PREFERRED EMBODIMENT

Electrode substrates comprise a supporting metal screen or grid of a metal such as steel or aluminum or other metal which need not be chemically resistant to the fuel cell environment. The substrate acts as a support for the balance of the material which provide the electrode physical and chemical characteristics. Typically, the substrate is grit blasted before spraying to remove all sharp edges. The first coating is prepared from Kynar 202, a vinylidene fluoride resin dispersion marketed by Pennsalt Chemical Corporation. The vinylidene fluoride is thinned to a sprayable consistency with methyl isobutylketone. Vinylidene fluoride is particularly advantageous since it dissolves in the solvent which allows the mixture to be readily sprayed over and completely cover the support. A layer of at least .001 of an inch is built up on the support. The coating is cured in a conventional oven 500° F. for 20 minutes. An adherent, continuous, pore free coating is obtained through the use of this combination.

Analogous thermoplastic materials may be used as long as the materials share in the important property of being corrosion resistant to the electrolyte of the cell and capable of being dissolved in a selected solvent and capable of forming a continuous film on the electrode substrate. The spray process of applying the coating is particularly suitable because it results in the desired coating thickness without blocking the support internal voids. Vinylidene fluoride will flow during cure since this material is a thermoplastic and will satisfactorily coat the wall surfaces of the substrate. Selection of fluorocarbon polymers which do not dissolve in a solvent result in porous coatings which will not provide corrosion resistance.

A second coating of preferably polytetrafluoroethylene mixed with 50–70 percent graphite particles is sprayed onto the substrate over the first coating to a thickness equivalent to at least the thickness of the first coating. The second coat is also cured at 500° F. for about 20 minutes. The first vinylidene fluoride coating is not disturbed during the second curing cycle and serves as a protective layer for the substrate. The second coating provides the conductive requirements of an electrode substrate with a surface resistance from about 50–150 ohms per inch. The second coating on curing is allowed to undergo some plastic flow to assure adhesion. However, excessive heating is to be avoided as flow tends to lower the porosity of the finished product and cover the conductive particles. A catalytic material may be added with the graphite particles so that the second coating may be a combination of conductive particles and catalytic material. However, the catalyst should be less than 10 percent by weight. The graphite particles, catalyst, polymer, and dispersant must be sprayable. It is necessary that the composition form an adherent porous film. The graphite particles are typically in the 50–70 percent range, the remainder being polymer and catalyst. The selection of the portions of solvent to form a sprayable consistency is within the ability of one skilled in the art. Both curing steps must be above the operating temperature of the cell.

The concept comprises the fabrication of a highly corrosion resistant conductive electrode substrate comprising a screen or porous metal substrate coated with a first non-porous layer of vinylidene fluoride and a second porous layer of graphite and polytetrafluoroethylene. These coatings are generally in the vicinity of .001 of an inch in thickness.

Although the preferred embodiment has been shown and described herein, it is to be understood that various changes and modifications may be made without departing from the spirit and scope of the invention.

I claim:

1. A method of making an improved gas diffusion fuel cell electrode characterized by dual coating layers uniformly applied to a porous metal substrate, comprising the steps of:

dissolving a fluorocarbon polymer in a solvent so that the solution is readily sprayable;

spraying the porous substrate with said fluorocarbon polymer-solvent solution until a first layer coating of at least .001 inch thickness is obtained;

curing said first layer coating at about 500° F. for about 20 minutes whereby a continuous pore-free coating adheres to the substrate, thinning a dispersion of a fluorocarbon polymer with a dispersant and 50 to 70 percent by weight graphite particles;

spraying a second layer coating of the thinned fluorocarbon polymer and graphite particle dispersion over the first layer coating until the thickness of at least the thickness of the first layer coating is obtained; and curing the second layer coating at about 500° F. for about 20 minutes whereby a porous conductive second layer results.

2. A method as defined in claim 1, wherein the fluorocarbon polymer of the first layer coating is vinylidene fluoride thinned with methyl isobutylketone and the polymer of the second layer coating is polytetrafluoroethylene.

3. The method of claim 1, including the step of mixing with the polytetrafluoroethylene coating and the graphite particles a catalytic material of no more than 10 percent by weight.

References Cited

UNITED STATES PATENTS

| | | | |
|---|---|---|---|
| 3,385,736 | 5/1968 | Deibert | 136—120 FC |
| 3,388,004 | 6/1968 | Rosenblatt | 136—120 FC |
| 3,453,354 | 7/1969 | Tejeda et al. | 117—21 |
| 3,010,536 | 11/1961 | Plurien et al. | 117—99 |
| 3,297,484 | 1/1967 | Niedrach | 136—120 FC |
| 3,480,538 | 11/1969 | Sturm | 136—120 FC |
| 3,242,011 | 3/1966 | Witherspoon | 136—120 FC |
| 3,395,049 | 7/1968 | Thompson | 136—120 FC |
| 3,432,355 | 3/1969 | Niedrach et al. | 136—120 FC |
| 3,532,556 | 10/1970 | Steele | 136—120 FC |
| 3,496,018 | 2/1970 | Hamlen et al. | 136—120 FC |

RALPH HUSACK, Primary Examiner

U.S. Cl. X.R.

117—75, 218, 226; 136—120 FC